(12) United States Patent  
Ducharme et al.

(10) Patent No.: US 7,421,048 B2  
(45) Date of Patent: Sep. 2, 2008

(54) SYSTEM AND METHOD FOR MULTIMEDIA DELIVERY IN A WIRELESS ENVIRONMENT

(75) Inventors: Paul Ducharme, Scarborough (CA); James Girardeau, Jr., Austin, TX (US); Adeline Chiu, Markham (CA); James Doyle, Toronto (CA)

(73) Assignee: ViXS Systems, Inc., Toronto, Ontario (CA)

( * ) Notice: Subject to any disclaimer, the term of this patent is extended or adjusted under 35 U.S.C. 154(b) by 646 days.

(21) Appl. No.: 11/038,856

(22) Filed: Jan. 20, 2005

(65) Prior Publication Data

US 2006/0161675 A1    Jul. 20, 2006

(51) Int. Cl.  
*H04L 7/00* (2006.01)

(52) U.S. Cl. .................. 375/354; 327/141; 327/142; 327/145; 327/153; 327/159; 327/156; 327/158; 327/162; 358/409; 358/410; 370/503; 370/505; 370/509; 370/512; 370/513; 713/400; 714/12

(58) Field of Classification Search .................. 375/354; 709/231; 370/509  
See application file for complete search history.

(56) References Cited

U.S. PATENT DOCUMENTS

| | | | |
|---|---|---|---|
| 4,866,395 A | 9/1989 | Hosteller | |
| 5,027,203 A | 6/1991 | Samad et al. | |
| 5,093,847 A | 3/1992 | Cheng | |
| 5,115,812 A | 5/1992 | Sano et al. | |
| 5,253,056 A | 10/1993 | Puri | |
| 5,475,434 A | 12/1995 | Kim | |
| 5,563,950 A | 10/1996 | Easter et al. | |
| 5,602,589 A | 2/1997 | Vishwanath et al. | |
| 5,635,985 A | 6/1997 | Boyce et al. | |
| 5,644,361 A | 7/1997 | Ran et al. | |
| 5,652,749 A | 7/1997 | Davenport et al. | |

(Continued)

FOREIGN PATENT DOCUMENTS

EP    0661826 A2    7/1995

(Continued)

OTHER PUBLICATIONS

Bertoglio et al.: "Intermedia Synchronization for Videoconference over IP"; Signal Processing; Image Communication; Elsevier Science Publishers; Amsterdam, NL; vol. 15; No. 1-2; Sep. 1999, pp. 149-164.

(Continued)

*Primary Examiner*—Shuwang liu  
*Assistant Examiner*—Dhaval Patel

(57) ABSTRACT

A multimedia processing system and method thereof are provided. The system and method provide for synchronizing a first clock of a multimedia decoder of a first multimedia processing device to a second clock of a multimedia encoder of a second multimedia processing device, synchronizing a first timing reference of the multimedia decoder to a second timing reference of the multimedia encoder, receiving, at a network interface of the first multimedia processing device, an encoded multimedia data stream from a network interface of the second multimedia processing device, wherein the encoded multimedia data stream is encoded by the multimedia encoder based on the second clock and the second timing reference, and decoding the encoded multimedia data stream at the multimedia decoder based on the first clock and the first timing reference.

30 Claims, 9 Drawing Sheets

U.S. PATENT DOCUMENTS

| | | |
|---|---|---|
| 5,732,391 A | 3/1998 | Fiocca |
| 5,737,020 A | 4/1998 | Hall et al. |
| 5,740,028 A | 4/1998 | Sugiyama et al. |
| 5,844,545 A | 12/1998 | Suzuki et al. |
| 5,850,443 A | 12/1998 | Van Oorschot et al. |
| 5,940,130 A | 8/1999 | Nilsson et al. |
| 5,996,029 A | 11/1999 | Sugiyama et al. |
| 6,005,623 A | 12/1999 | Takahashi et al. |
| 6,005,624 A | 12/1999 | Vainsencher |
| 6,014,694 A | 1/2000 | Aharoni et al. |
| 6,040,863 A | 3/2000 | Kato |
| 6,081,295 A | 6/2000 | Adolph et al. |
| 6,141,693 A | 10/2000 | Perlman et al. |
| 6,144,402 A | 11/2000 | Norsworthy et al. |
| 6,167,084 A | 12/2000 | Wang et al. |
| 6,182,203 B1 | 1/2001 | Simar, Jr. et al. |
| 6,215,821 B1 | 4/2001 | Chen |
| 6,219,358 B1 | 4/2001 | Pinder et al. |
| 6,222,886 B1 | 4/2001 | Yogeshwar |
| 6,236,683 B1 | 5/2001 | Mougeat et al. |
| 6,259,741 B1 | 7/2001 | Chen et al. |
| 6,263,022 B1 | 7/2001 | Chen et al. |
| 6,300,973 B1 | 10/2001 | Feder et al. |
| 6,307,939 B1 | 10/2001 | Vigarie |
| 6,314,138 B1 | 11/2001 | Lemaguet |
| 6,323,904 B1 | 11/2001 | Knee |
| 6,327,273 B1 * | 12/2001 | Van der Putten et al. .... 370/503 |
| 6,366,614 B1 | 4/2002 | Pian et al. |
| 6,385,248 B1 | 5/2002 | Pearlstein et al. |
| 6,438,168 B2 | 8/2002 | Arye |
| 6,480,541 B1 | 11/2002 | Girod et al. |
| 6,526,099 B1 | 2/2003 | Chistopoulos et al. |
| 6,549,561 B2 | 4/2003 | Crawford |
| 6,584,509 B2 | 6/2003 | Putzolu |
| 6,714,202 B2 | 3/2004 | Dorrell |
| 6,724,726 B1 | 4/2004 | Coudreuse |
| 6,748,020 B1 | 6/2004 | Eifrig et al. |
| 7,263,110 B2 * | 8/2007 | Fujishiro .................... 370/503 |
| 2001/0026591 A1 | 10/2001 | Keren et al. |
| 2002/0106022 A1 | 8/2002 | Takahashi et al. |
| 2002/0110193 A1 | 8/2002 | Kyoon et al. |
| 2002/0138259 A1 | 9/2002 | Kawahara |
| 2002/0145931 A1 | 10/2002 | Pitts |
| 2002/0196851 A1 | 12/2002 | Lecoutre |
| 2003/0093661 A1 | 5/2003 | Loh et al. |
| 2003/0148785 A1* | 8/2003 | Mangal et al. .............. 455/552 |
| 2003/0152148 A1 | 8/2003 | Laksono |
| 2003/0169776 A1 | 9/2003 | Reesor |
| 2004/0090994 A1* | 5/2004 | Lockridge et al. ........... 370/509 |
| 2004/0174907 A1 | 9/2004 | Van Der Putten |
| 2006/0009246 A1* | 1/2006 | Marinier et al. ............. 455/502 |
| 2006/0075133 A1* | 4/2006 | Kakivaya et al. ............ 709/237 |

FOREIGN PATENT DOCUMENTS

| | | | |
|---|---|---|---|
| EP | 0739138 | A2 | 10/1996 |
| EP | 0805599 | A2 | 11/1997 |
| EP | 0855805 | A2 | 7/1998 |
| EP | 0896300 | B1 | 2/1999 |
| EP | 0901285 | A1 | 2/1999 |
| EP | 0955607 | A2 | 11/1999 |
| EP | 1032214 | A2 | 8/2000 |
| EP | 1087625 | A2 | 3/2001 |
| EP | 1 089 482 | A | 4/2001 |
| EP | 1 339 182 | A | 8/2003 |
| JP | 07-210670 | A | 8/1995 |
| WO | WO 01/95633 | A2 | 12/2001 |
| WO | WO 0209331 | A | 1/2002 |
| WO | WO 02/080518 | A2 | 10/2002 |

OTHER PUBLICATIONS

Yu, Donghoom, et al., "Fast Motion Estimation for Shape Coding in MPEG-4," IEEE Transactions on Circuits and Systems for Video Technology, vol. 13, No. 4, 2003 IEEE, Apr. 2003, pp. 358-363.

Pyun, Jae-Young, "QoS Provisioning for Video Streaming Over IEEE 802.11 Wireless LAN," (abridged) IEEE Conferences in Consumer Electronics, Jun. 16, 2003, EE Times, Seoul, Korea, <http://eetimes.com/printableArticle?doc_id=OEG2003061S0070> retrieved Jul. 8, 2003.

Youn, Jeongnam et al., "Video Transcoding For Multiple Clients," Proceedings of the SPIE, Bellingham, VA, vol. 4067, XP008012075, pp. 76-85, University of Washington, Sealttle, WA, date unknown.

Lengwehasatit, Krisda et al., "Computationally Scalable Partial Distance Based Fast Search Motion Estimation," Packet Video Corp., San Diego, California, date unknown.

Takahashi, Kuniaki, et al., "Motion Vector Synthesis Algorithm for MPEG2-to-MPEG4 Transcoder," Proceedings of the SPIE, Bellingham, VA, vol. 4310, Sony Corporation, XP008000078, pp. 387-882, 2001 SPIE.

Soares, Luis Ducla, et al., "Influence of Encoder Parameters on the Decoded Video Quality for MPEG-4 Over W-CDMA Mobile Networks," NTT DoCoMo, Inc., date unknown.

Aggarwal, Manoj et al., "Efficient Huffman Decoding," 2000 IEEE, 0-7803-6297-7, pp. 936-939, University of Illinois at Urbana-Champaign, Urbana, IL.

Sherwood, P. Greg et al., "Efficient Image and Channel Coding for Wireless Packet Networks," University of California, La Jolla, California, date unknown.

Assuncao, Pedro et al., "Rate Reduction Techniques for MPEG-2 Video Bit Streams," SPIE, vol. 2952, Apr. 1996, pp. 450-459, University of Essex, Colchester, England.

Yin, Peng et al., "Video Transcoding by Reducing Spatial Resolution," Princeton University, 2000, Princeton, New Jersey.

Shanableh, Tamer et al., "Heterogeneous Video Transcoding to Lower Spatio-Temporal Resolutions and Difference Encoding Formats," IEEE Transactions on Multimedia, vol. 2, No. 2, Jun. 2000, pp. 101-110, Engineering and Physical Sciences Researc Counsel, Colchester, U.K.

Wiegand, Thomas et al., "Long-Term Memory Motion-Compensated Prediction for Rubust Video Transmission," in Proc. ICIP 2000, University of Erlangen-Buremberg, Erlangen, Germany.

Fan, Zhigang et al. "Maximum Likelihood Estimation of JPEG Quantization Table in the Identification of Bitmap Compression History," Xerox Corporation, Webster, New York, date unknown.

Thomas, Shine M. et al., "An Efficient Implentation of MPEG-2 (BC1) Layer 1 & Layer 2 Stereo Encoder on Pentium-III Platform", pp. 1-10, Sasken Communication Technologies Limited, Bangalore, India, date unknown.

Ramanujan, Ranga S. et al., "Adaptive Streaming of MPEG Video Over IP Networks," 22nd IEEE Conference on Local Computer Networks (LCN '97), Nov. 02-05, 1997, 1997 IEEE, pp. 398-409, Architecture Technology Corporation, Minneapolis, MN.

Rejaie, Reza et al., "Architectural Considerations for Playback of Quality Adaptive Video Over the Internet," XP002177090, 2000 IEEE pp. 204-209, AT&T Labs, Menlo Park, California.

Bouras, C. et al., "On-Demand Hypermedia/Multimedia Service Over Broadband Networks," XP-002180545, 1996 IEEE Proceedings of HPDC-5 '96, pp. 224-230, University of Patras, Patras, Greece.

Chalidabhongse, Junavit et al., "Fast Motion Vector Estimation Using Multiresolution-Spatio-Temporal Correlations," IEEE Transactions On Circuits and Systems For Video Technology, vol. 7, No. 3 Jun. 1997, pp. 477-488.

Oh, Hwang-Seok et al., "Block-Matching Algorithm Based On An Adaptive Reduction of the Search Area For Motion Estimation." Real-Time Imaging, Academic Press Ltd., vol. 56, No. 5, Oct. 2000, pp. 407-414, XP004419498 ISSN: 1077-2014, Taejon, Korea.

Lee, Liang-Wei et al., "Dynamic Search-Window Adjustment and Interlaced Search for Block-Matching Algorithm," IEEE Transactions On Circuits and Systems for Video Technology, IEEE, vol. 3, No. 1, Feb. 3, 1993, pp. 85-87, XP000334581 ISSN: 1051-8215, New York.

Fukunaga, Shigeru et al., "MPEG-4 Video Verification Model Version 16.0" International Organization for Standardization: Coding of Moving Pictures and Audio, vol. N3312, Mar. 2000, pp. 1-380, XP000861688,.

Kroner, Sabine et al., "Edge Preserving Noise Smoothing With An Optimized Cubic Filter," DEEI, University of Trieste, Trieste, Italy, date unknown.

Kim, Jaemin et al., "Spatiotemporal Adaptive 3-D Kalman Filter for Video," pp. 1-12. Samsung Semiconductor, Inc. San Jose, Calfiornia, date unknown.

Liu, Julia J., "ECE497KJ Course Project: Application of Wiener Filtering In Image and Video De-Noising," pp. 1-15, May 21, 1997.

Jostschulte, K. et al., "A Subband Based Spatio-Temporal Noise Reduction Technique for Interlaced Video Signals," University Dortmund, Dortmund, Germany, date unknown.

Kossentini, Faouzi et al. "Predictive RD Optimized Motion Estimation for Very Low Bit-Rate Video Coding," 1997 IEEE, XP-000726013, pp. 1752-1963, Sep. 1, 1996, 1997 International Conference on Image Processing, Vancouver, Canada.

Tourapis, Alexis et al. "New Results on Zonal Based Motion Estimation Algorithms—Advanced Predictive Diamond Zonal Search," 2001 IEEE, pp. V 183-V 186, The Hong Kong University of Science and Technology, Clear Water Bay, Kowloon, Hong Kong.

Brandenburg, Karlheinz, "MP3 and AAC Explained," Proceedings of AES 17th International Conference, XP008004053, pp. 99-110, Erlangen, Germany, date unknown.

Painter, Ted et al., "Perceptual Coding of Digital Audio," Proceedings of the IEEE, vol. 88, No. 4, Apr. 2000, pp. 451-513, XP001143231, ISSN: 0018-9219, Arizona State University, Tempe, AZ.

Hassanzadegan, Hooman et al., "A New Method for Clock Recovery in MPEG Decoders," pp. 1-8, Basamad Negar Company, Tehran, Iran, date unknown.

Kan, Kou-Sou et al., "Low-Complexity and Low-Delay Video Transcoding for Compressed MPEG-2 Bitstream," Natinal Central University, Chung-Li, Taiwan, date unknown.

Mitchell et al., "MPEG Video Compression Standard: 15.2 Encorder and Decorder Buffering," Chapman and Hall Digital Multimedia Standards Series, pp. 340-356, XP002115299, ISBN: 0-412-08771-5, Chapman and Hall, New York, date unknown.

Whybray, M.W. et al., "Video Coding—Techniques, Standards and Applications," BT Technol J. vol. 14, No. 4, Oct. 4, 1997, pp. 86-100, XP000722036.

"Sharp Product Information: VTST-Series NTSC/PAL Electronic Television Tuners," RF Components Group, Sharp Microelectronics of the America, 1997.

Edwards, Larry M., "Satisfying Your Need for Net Speed," San Diego Metropolitan, Sep. 1999, <<www.sandiegometro.com/1999/sept/speed.html>>, retrieved on Jul. 19, 2001.

Oz, Ran et al., "Unified Headend Technical Management of Digital Services," BigBend Networks, Inc., date unknown.

Muriel, Chris, "What is Digital Satellite Television?," What is Digital Television Rev. 3.0, Apr. 21, 1999, SatCure, Sandbach, England, <<http://www.netcentral.co.uk/satcure/digifaq.htm>>, access on Apr. 20, 2001.

"Conexant Products & Tech Info: Product Briefs: CX24108," 2000-2002 Conexant Systems, Inc. access on Apr. 20, 2001.

"Conexant Products & Tech Info: Product Briefs: CX22702," 2000-2002 Conexant Systems, Inc. access on Apr. 20, 2001.

"TDC: Components for Modems & Digital Infotainment: Direct Broadcast Satellite Chipset," 2001 Telecom Design Communications Ltd., U.K., <<http://www.tdc.co.uk/modmulti/settop/index.htm>>, access on Apr. 20, 2001.

"White Paper: Super G: Maximizing Wireless Performance," Mar. 2004, Atheros Communications, Inc., pp. 1-20, Document No. 991-00006-001, Sunnyvale, CA.

Kwok, Y.K. et al., "Efficient Multiple Access Control Using a Channel-Adaptive Protocol for a Wireless ATM-Based Multimedia Services Network," Mar. 29, 2000, Computer Communications 24(2001) 970-983, University of Hong Kong, Hong Kong, PRC.

Liang, Ying-Chang et al., "Joint Downlink Beamforming, Power Control, and Data Rate Allocation for DS-CDMA Mobile Radio with Multimedia Services," 2000 IEEE, pp. 1455-1457, Ceneter for Wireless Communication, Singapore.

Razavi, Behzad, "Challenges in Portable RF Transceiver Design," Sep. 1996, 1996 IEEE, pp. 12-25, Circuits & Devices.

Mannion, Patrick, "IceFyre Device Cools 802.11a Power Consumption," Sep. 24, 2001, Planet Analog, National Semiconductor, <<http://www.planetanalog.com/story/OEG20010924S0079>>, access on Nov. 5, 2001.

"ICE Fyre Semiconductor: IceFyre 5-GHz OFDM Modem Solution," Sep. 2001, pp. 1-6, IceFyre: Rethink Wireless, IceFyre Semiconductor, Inc.

Pozar, David M., "Theory and Design of Ferrimagnetic Components," 1990, pp. 529, Microwave Engineering, Addison-Wesley Publishing Company, Inc.

"Part 11: Wireless LAN Medium Access Control (MAC) and Physical Layer (PHY) Specifications: High-Speed Physical Layer in the 5 GHz Band," 1999 IEEE, pp. 1-83, Supplement to IEEE Standard fo rInformation Technology, IEEE Std 802.11a-1999, LAN/MAN Standards Committee.

Ciciora, Walter S., "Cable Television in the United States: An Overview," May 25, 1995, pp. 1-90, Cable Television Laboratories, Inc., Louisville, Colorado.

* cited by examiner

SYSTEM AND METHOD FOR MULTIMEDIA DELIVERY IN A WIRELESS ENVIRONMENT

CROSS-REFERENCE TO RELATED APPLICATIONS

Related subject matter is found in a co-pending U.S. patent application, having application No. 09/823,646, filed Mar. 20, 2001, entitled "ADAPTIVE BANDWIDTH FOOTPRINT MATCHING FOR MULTIPLE COMPRESSED VIDEO STREAMS IN A FIXED BANDWIDTH NETWORK," which is hereby incorporated herein by reference in its entirety. Related subject matter is found in a co-pending U.S. patent application, having application No. 09/864,524, filed May 24, 2001, entitled "METHOD AND APPARATUS FOR A MULTIMEDIA SYSTEM," which is hereby incorporated herein by reference in its entirety. Related subject matter is found in a co-pending U.S. patent application, having application No. 09/864,602, filed May 24, 2001, entitled "METHOD AND APPARATUS OF MULTIPLEXING A PLURALITY OF CHANNELS IN A MULTIMEDIA SYSTEM," which is hereby incorporated herein by reference in its entirety. Related subject matter is found in a co-pending U.S. patent application, having application No. 09/864,476, filed May 24, 2001, entitled "METHOD AND APPARATUS FOR MANAGING RESOURCES IN A MULTIMEDIA SYSTEM," which is hereby incorporated herein by reference in its entirety. Related subject matter is found in a co-pending U.S. patent application, having application No. 09/990,976, filed Nov. 21, 2001, entitled "SYSTEM AND METHOD FOR MULTIPLE CHANNEL VIDEO TRANSCODING," which is hereby incorporated herein by reference in its entirety. Related subject matter is found in a co-pending U.S. patent application, having application No. 09/990,737 filed Nov. 21, 2001, entitled "METHOD AND SYSTEM FOR RATE CONTROL DURING VIDEO TRANSCODING," which is hereby incorporated herein by reference in its entirety. Related subject matter is found in a co-pending U.S. patent application, having application No. 10/137,151, filed May 2, 2002, entitled "METHOD AND SYSTEM FOR PROTECTING VIDEO DATA," which is hereby incorporated herein by reference in its entirety. Related subject matter is found in a co-pending U.S. patent application, having application No. 10/174,371, filed Jun. 18, 2002, entitled "DYNAMICALLY ADJUSTING DATA RATE OF WIRELESS COMMUNICATIONS," which is hereby incorporated herein by reference in its entirety. Related subject matter is found in a co-pending U.S. patent application, having application No. 10/376,581, filed Feb. 28, 2003, entitled "METHOD AND APPARTUS FOR NON-INTRUSIVE TRANSCEIVER PROPERTY ADJUSTMENT," which is hereby incorporated herein by reference in its entirety. Related subject matter is found in a co-pending U.S. patent application, having application No. 10/376,853, filed Feb. 28, 2003, entitled "SYSTEM FOR PROVIDING DATA TO MULTIPLE DEVICES AND METHOD THEREOF," which is hereby incorporated herein by reference in its entirety. Related subject matter is found in a co-pending U.S. patent application, having application No. 10/345,710, filed Jan. 16, 2003, entitled "METHOD OF MOTION VECTOR PREDICTION AND SYSTEM THEREOF," which is hereby incorporated herein by reference in its entirety. Related subject matter is found in a co-pending U.S. patent application, having application No. 10/345,847, filed Jan. 16, 2003, entitled "METHOD OF VIDEO ENCODING USING WINDOWS AND SYSTEM THEREOF," which is hereby incorporated herein by reference in its entirety. Related subject matter is found in a co-pending U.S. patent application, having application No. 10/375,582, filed Feb. 24, 2003, entitled "METHOD AND SYSTEM FOR TRANSCODING VIDEO DATA," which is hereby incorporated herein by reference in its entirety. Related subject matter is found in a co-pending U.S. patent application, having application No. 10/461,095 filed Jun. 13, 2003, entitled "SYSTEM AND METHOD FOR PROCESSING AUDIO FRAMES," which is hereby incorporated herein by reference in its entirety. Related subject matter is found in a co-pending U.S. patent application, having application No. 10/683,062, filed Oct. 10, 2003, entitled "METHOD AND APPARATUS FOR ACCURATELY DETECTING VALIDITY OF A RECEIVED SIGNAL," which is hereby incorporated herein by reference in its entirety. Related subject matter is found in a co-pending U.S. patent application, having application No. 10/673,693, filed Sep. 29, 2003, entitled "METHOD AND SYSTEM FOR SCALING IMAGES," which is hereby incorporated herein by reference in its entirety. Related subject matter is found in a co-pending U.S. patent application, having application No. 10/673,612 filed Sep. 29, 2003, entitled "METHOD AND SYSTEM FOR NOISE REDUCTION IN AN IMAGE," which is hereby incorporated herein by reference in its entirety.

FIELD OF THE DISCLOSURE

The present disclosure relates generally to multimedia data delivery and more particularly to multimedia delivery in wireless systems.

BACKGROUND

In order to achieve reliable broadcast-quality motion picture experts group (MPEG) audio/video (A/V) distribution in an MPEG A/V delivery system, the audio and video received and encoded at an MPEG server typically must be played back at an MPEG client at substantially the same rate at which the MPEG data was received at the server. This matching rate significantly contributes to the reliable delivery of A/V data as it allows the decoder at the MPEG client to consume A/V data at the rate at which it was generated, thereby reducing or avoiding buffer underflow or overflow and thus reducing or eliminating artifacts in the displayed video and audio. In view of the benefits of the matching rate requirement, the MPEG standards, e.g., ISO/IEC 13818, typically institute a quality requirement that the jitter between the server and the client remain within +/−500 nanoseconds (ns). Accordingly, the MPEG standards implement elaborate mechanisms in an effort to fulfill this jitter requirement in standard broadcast systems. These mechanisms typically are satisfactory in satellite, cable or terrestrial delivery systems due to the near constant delay between the server and the client. However, in wireless networks and other similar networks, these mechanisms often fail because the wireless links typically do not exhibit a substantially constant delay between wireless devices. To illustrate, in IEEE 802.11 applications, the frequency, and thus the symbol rate, used to transmit information is dependent on the distance between the transmitter and the receiver. Accordingly, as the distance between the server and client varies, so does the jitter in the transmission of MPEG data between the server and client. Similarly, obstructions between the server and the client may cause dynamic changes in the symbol rate, thereby resulting in dynamic changes in the transmission time and therefore the jitter of MPEG data.

The magnitude of jitter also may increase as a result of the implementation of MPEG delivery systems within a network, such as a local area network (LAN), a wide area network (WAN), a metropolitan area network (WAN), the Internet and the like. In these instances, the transmission of MPEG data from a server to a client typically would require the processing of the MPEG data at various layers of the network stack (e.g., the telecommunications protocol/internet protocol (TCP/IP) stack) at the server, the transmission of the processed MPEG data via a wireless medium, and then the subsequent processing of the MPEG data at various layers of the network stack at the client. Considerable additional jitter maybe introduced due to variances in the software and hardware implementing these network stacks. The overall jitter resulting from these variances may be of such magnitude so as to prevent the client from synchronizing to the server. Accordingly, improved techniques for synchronizing devices in wireless environments so as to reduce jitter would be advantageous.

BRIEF DESCRIPTION OF THE DRAWINGS

The purpose and advantages of the present disclosure will be apparent to those of ordinary skill in the art from the following detailed description in conjunction with the appended drawings in which like reference characters are used to indicate like elements, and in which.

DETAILED DESCRIPTION OF THE DISCLOSURE

The following description is intended to convey a thorough understanding of the present disclosure by providing a number of specific embodiments and details involving synchronized multimedia data delivery. It is understood, however, that the present disclosure is not limited to these specific embodiments and details, which are exemplary only. It is further understood that one possessing ordinary skill in the art, in light of known systems and methods, would appreciate the use of the disclosure for its intended purposes and benefits in any number of alternative embodiments, depending upon specific design and other needs.

FIGS. 1-11 illustrate exemplary techniques for the synchronized delivery and display of multimedia data between a multimedia server and a multimedia client. For ease of illustration, the exemplary techniques are discussed in the context of an MPEG delivery system comprising an MPEG server and an MPEG client in a wireless LAN, as well as in the context of conventional MPEG timing standards, which typically are based on a 90 KHz clock (which generally is derived from a 27 MHz clock signal divided by 300). However, those skilled in the art may utilize these techniques in other server/client systems, other multimedia formats, in other types of networks and/or in other types of timing schemes using the guidelines provided herein without departing from the spirit or the scope of the present disclosure.

Figure 1:
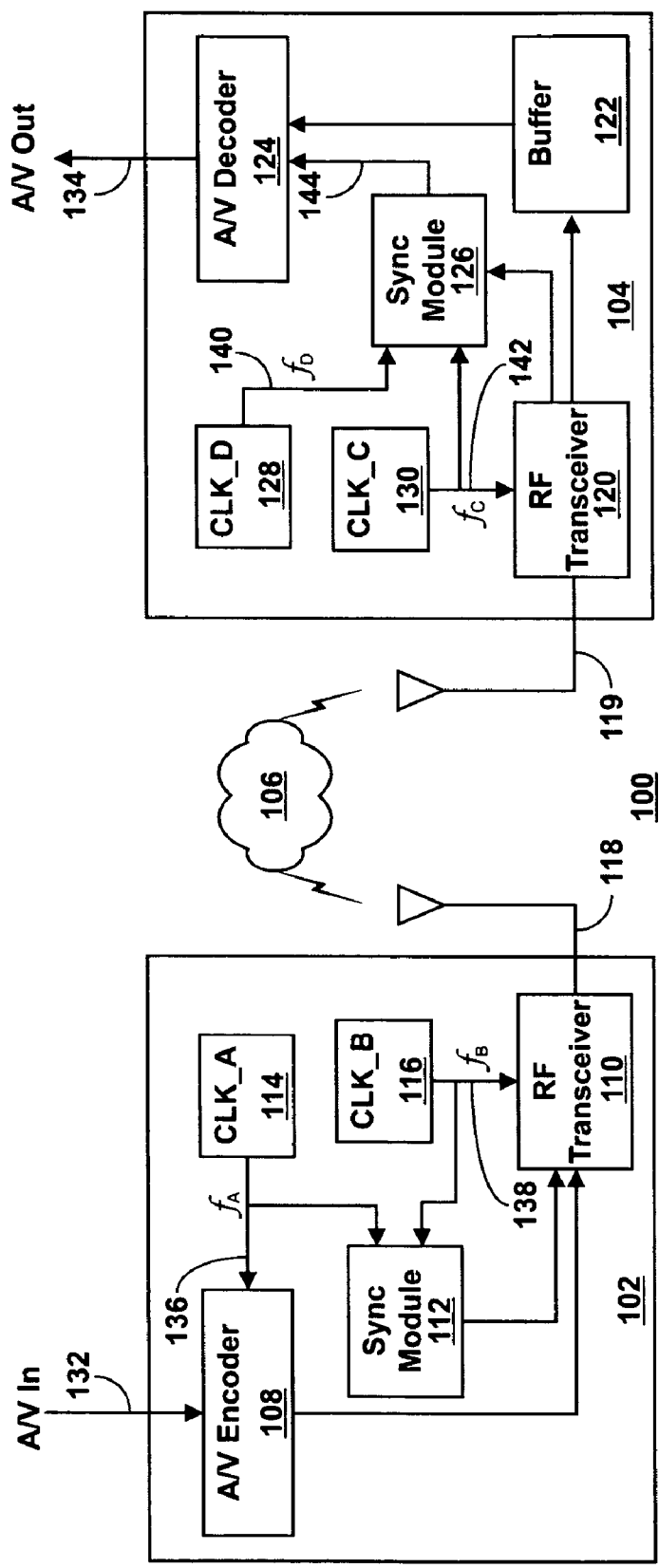
FIG. 1 is a block diagram illustrating an exemplary MPEG delivery system in accordance with at least one embodiment of the present disclosure.

Referring now to FIG. 1, an exemplary MPEG delivery system 100 is illustrated in accordance with at least one embodiment of the present disclosure. In the depicted example, the delivery system 100 comprises an MPEG server 102 coupled to an MPEG client 104 via a wireless link 106. The MPEG server 102 comprises an audio/video (A/V) encoder 108, a radio frequency (RF) transceiver 110, a transmitter synchronization module 112, clock sources 114 and 116 and an antenna 118. The MPEG client 104 comprises an antenna 119, an RF transceiver 120, an input buffer 122, an A/V decoder 124, a receiver synchronization module 126 and clock sources 128 and 130. The A/V encoder 108 may comprise any of a variety of MPEG encoders or transcoders and the A/V decoder 124 similarly may comprise any of a variety of MPEG decoders or transcoders. The RF transceivers 110 and 120 may include wireless transmitters compatible with one or more wireless protocols, such as, for example, IEEE 802.11 a/b/c/e/g/i (collectively referred to herein as IEEE 802.11), and the like. The clock sources 114, 116, 128 and 130 may comprise any of a variety of crystals or oscillators that may be used to generate a clock signal, including, but not limited to overtone crystal oscillators, fundamental crystal oscillators, canned oscillators, LC oscillators, ceramic resonators, VCXO oscillators, and the like.

At the MPEG server 102, the A/V encoder 108 receives input A/V data 132 and provides as an output an encoded or transcoded representation of the input A/V data 132. The RF transceiver 110 packetizes the encoded/transcoded A/V data and provides it for transmission over the wireless link 106 via the antenna 118. The A/V data 132 may represent, for example, MPEG audio and/or video data provided by a satellite feed, a cable head end, an Internet data stream, a DVD player and the like. At the MPEG client 104, the packetized A/V data is received by the RF transceiver 120 via the antenna 119. The A/V data is depacketized and provided to the input buffer 122 for storage. The A/V data is provided from the input buffer 122 to the A/V decoder 124 for decoding or transcoding and the resulting decoded/transcoded A/V data 134 may be provided for display on one or more display devices, stored on a hard disk or optical drive, retransmitted to another device for further processing, and the like.

As illustrated, the A/V encoder 108 is clocked by clock signal 136 (having frequency $f_A$) provided by clock source 114 and the transceiver 110 is clocked by clock signal 138 (having frequency $f_B$) provided by clock source 116. At the MPEG client 104, the A/V decoder 124 is clocked by clock signal 144 derived from a clock signal 140 (having frequency $f_D$) provided by the clock source 128 and the transceiver 120 is clocked by clock signal 142 (having frequency $f_C$) provided by the clock source 130. For ease of discussion, the frequencies $f_A$ and $f_D$ are assumed to be approximately 27 megahertz (MHz) in accordance with the MPEG standards and the frequencies $f_B$ and $f_C$ are assumed to be approximately 40 MHz. However, clock signals having other frequencies may be used, as appropriate, without departing from the spirit or the scope of the present disclosure.

Ideally, the clock sources 114 and 128 are perfectly synchronized and the clock sources 116 and 130 are perfectly synchronized, thereby reducing or eliminating jitter between the encoding of the A/V data 132 at the MPEG server 102 and the subsequent decoding of the A/V data 134 at the MPEG client 104. However, process variations, changes in temperature, voltage, and manufacturing defects, typically result in the production of clock sources that do not maintain an exactly constant frequency. This frequency drift typically is not mirrored between the clock sources of the MPEG server 102 and the MPEG client 104, and therefore potentially results in unacceptable jitter in the absence of a technique for adjusting the clock sources of the MPEG client 102 to more closely match the clock sources of the MPEG server 104. Accordingly, in at least one embodiment, the MPEG distribution system 100 employs a synchronization technique based on the frequency offsets between multiple clocks.

In at least one embodiment, the transceiver synchronization module 112 receives as inputs the clock signals 136 and 138, and from these clock signals determines a clock offset value (herein referred to as $\Delta ppm_1$) between the clock signals 136 and 138. The clock offset value $\Delta ppm_1$ preferably is represented as parts-per-million (ppm), but in other instances may be represented as a frequency value or clock tick value. An exemplary technique for determining the clock offset value $\Delta ppm_1$ is discussed below with reference to FIG. 2. In at least one embodiment, the clock offset value $\Delta ppm_1$ is representative of the variance between the clock signals 136 and 138, i.e., whether the clock source 114 is slower or faster relative to the clock source 116.

Figure 11:
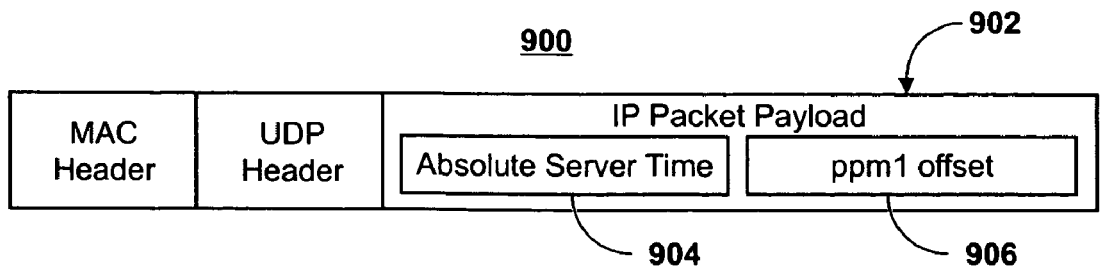
FIG. 11 is a block diagram illustrating an exemplary heartbeat message in accordance with at least one embodiment of the present disclosure.

The synchronization module 112 then provides the clock offset value $\Delta ppm_1$ to the RF transceiver 110 for transmission to the MPEG client 104. In at least one embodiment, RF transceiver 110 packetizes the clock offset value $\Delta ppm_1$ by embedding it within a maintenance message between the MPEG server 102 and the MPEG client 104. To illustrate, FIG. 11 depicts an exemplary maintenance message packet 900 having in its payload 902 an absolute server time field 904 for providing an indication of the time at the MPEG server 102 and a $ppm_1$ offset field 906 for providing an indication of the value of $\Delta ppm_1$. At the MPEG client 104, the RF transceiver 120 receives the packetized clock offset value $\Delta ppm_1$, depacketizes the clock offset value $\Delta ppm_1$ and provides it to the receiver synchronization module 126. In addition, the RF transceiver 120 or the synchronization module 126 determines a second clock offset (herein referred to as $\Delta ppm_2$) between the clock signals 138 and 142. As with the clock offset $\Delta ppm_1$, the clock offset $\Delta ppm_2$ preferably is represented as ppm, but also may be represented by, for example, a frequency value or a clock tick value. The RF transceiver 120 then provides the clock offset value $\Delta ppm_2$ to the synchronization module 126. In at least one embodiment, the synchronization module 126 utilizes the clock offset values $\Delta ppm_1$ and $\Delta ppm_2$ to adjust the clock signal 144 provided to the A/V decoder 124 to adjust for the jitter present between the clock sources 114 and 116 and the clock sources 116 and 130, as discussed in greater detail below.

It will be appreciated that the use of the clock offset values $\Delta ppm_1$ and $\Delta ppm_2$ may result in substantial frequency drift over time as there is no feedback loop between the clocks 128, 130 and the clocks 114 and 116. Accordingly, in at least one embodiment, the synchronization module 126 monitors the fullness of the input buffer 122 to gauge the effective synchronization of the clocks 128, 130 to the clocks 114, 116. Generally, when the clock signal of an MPEG decoder is adequately synchronized to the clock signal of an MPEG encoder, the buffer supplying MPEG data to the decoder typically remains within a certain buffer fullness because the data typically is output from the buffer at the same rate it is input due to the adequate clock synchronization. However, when the clock signals are not adequately synchronized, buffer overflow or underflow may result. Accordingly, when the synchronization module 126 detects that the input buffer 122 may be heading toward a buffer underflow or overflow condition, the synchronization module 126 may implement a clock correction procedure as described in detail below.

Figure 2:
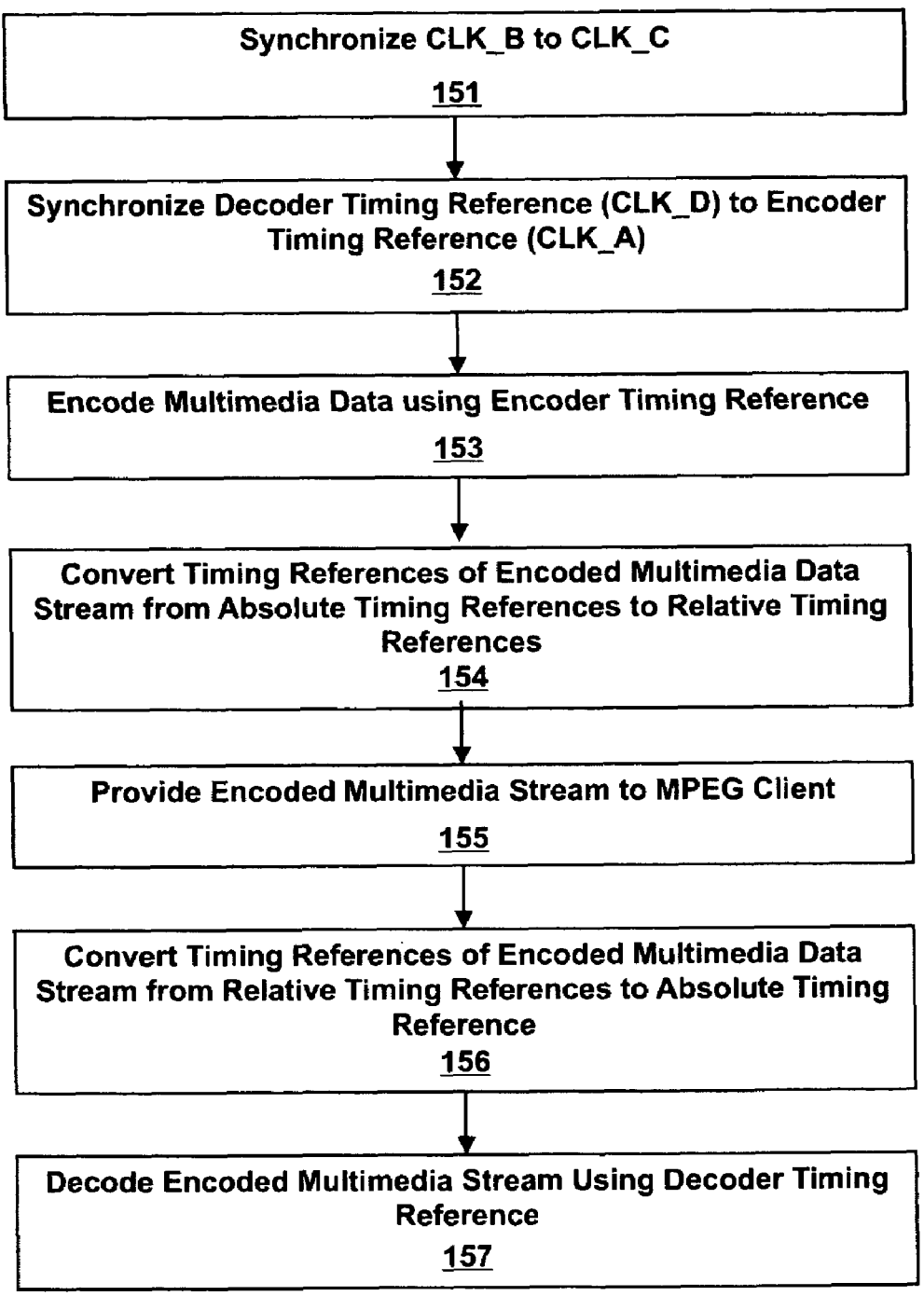
FIG. 2 is a flow diagram illustrating an exemplary operation of the MPEG delivery system of FIG. 1 in accordance with at least one embodiment of the present disclosure.

Referring to FIG. 2, an exemplary operation of the MPEG delivery system 100 of FIG. 1 is illustrated in accordance with at least one embodiment of the present disclosure. The method 150 representing the exemplary operation initiates at step 150, wherein the clock 130 of the MPEG client 104 is synchronized to the clock 116 of the MPEG server 102 using any of a variety of techniques known to those skilled in the art. At step 152, the decoder 124 timing reference (e.g., derived from clock 128) of the MPEG client 104 is synchronized to the encoder 108 timing reference (e.g., clock 114) of the MPEG server 102. Exemplary techniques for achieving this synchronization are described in greater detail below with reference to FIGS. 3-8. After the clocks of the MPEG server 102 and the MPEG client 104 are synchronized, MPEG data streams may be encoded at the MPEG server 102 and transmitted via the wireless network 106, for example, to the MPEG client 104 for subsequent decoding and display. In at least one embodiment, the timing reference values embedded in the MPEG data stream (e.g., program clock references (PCRs) or system clock references (SCRs)) may be converted from absolute values (i.e., values that refer directly to a fixed timing) to relative values (i.e., timing values that are relative to a particular timing point). Thus, an absolute time reference may be viewed as a measurement of a single clock at a particular time, while a relative time reference may be viewed as a calculation of the difference between two clocks measured simultaneously. As described in greater detail below with reference to FIG. 9, this conversion may be implemented by subtracting the local clock reference of the MPEG server 102 from the absolute timing values in the MPEG data stream at the MPEG server 102 prior to providing the MPEG data stream to the MPEG client 104.

At step 155, the MPEG data stream is packetized and provided to the MPEG client 104 via the wireless network 106. At step 156, the relative timing reference values in the MPEG data stream are converted back to absolute timing reference values. As described below with reference to FIG. 9, the MPEG client 104 may convert the relative timing reference values back to absolute timing values by adding the client's local clock reference at the MPEG client 104 to the relative timing reference values. The MPEG data stream then may be buffered in the input buffer 122 and then provided to the A/V decoder 124 at the appropriate time for decoding and display.

Figure 3:
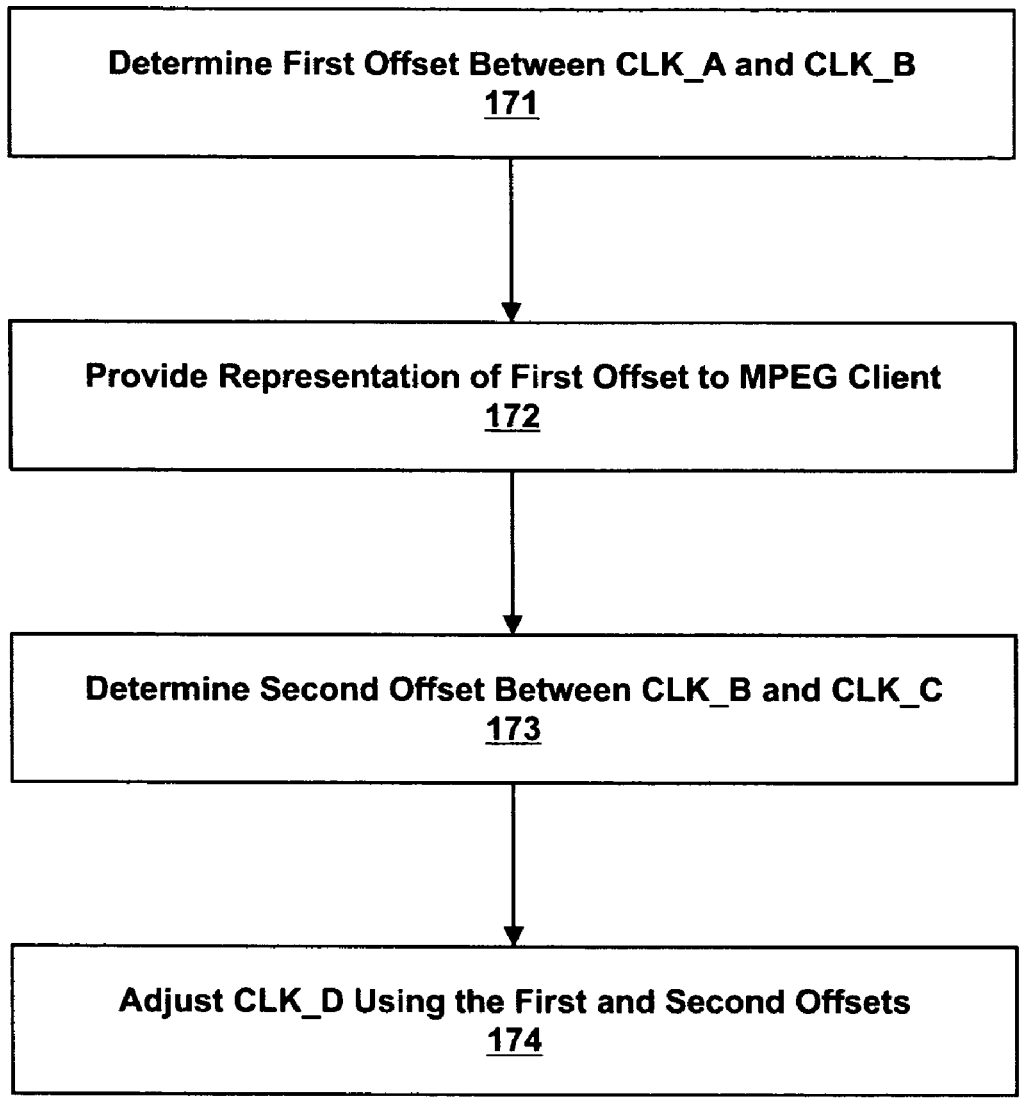
FIG. 3 is a flow diagram illustrating an exemplary method for synchronizing a multiple clocks in accordance with at least one embodiment of the present disclosure.

Referring now to FIG. 3, an overview of an exemplary method for synchronizing the timing reference used by the A/V decoder 124 of the MPEG client 104 to the timing reference used by the A/V encoder 108 of the MPEG server 102 is illustrated in accordance with at least one embodiment of the present disclosure. The illustrated method 170 initiates at step 171 wherein a first offset between the clock 114 and the clock 116 is determined. As described in detail with reference to FIG. 4, this first offset may be derived from a ratio of the number of clock ticks or cycles of the clock 116 to the number of clock ticks or cycles of the clock 114 over a predetermined period. The first offset therefore may represent a relative synchronization between the clocks 114 and 116.

At step 172, a representation of the first offset is provided to the MPEG client 104. To illustrate, the first offset representation may be packetized and transmitted as one or more packets via the wireless transceivers 110 and 120. At step 173, a second offset between the clock 116 of the MPEG server 102 and the clock 130 of the MPEG client 104 is determined. The second offset may be determined using any of a variety of techniques known to those skilled in the art, such as, for example, by using time domain correlation on a short synch training period to determine rough time and frequency alignment and then using time domain correlation in conjunction with frequency domain analysis to determine fine timing and frequency alignment. Time domain correlation and phase information from the OFDM pilot signal and OFDM constellation then may be used to drive an increasingly finer frequency offset between the transceivers 110 and 120. The second offset therefore may represent a relative synchronization between the clocks 116 and 130.

As noted above, the first offset represents the relative synchronization between the clocks 114 and 116 and the second offset may represent the relative synchronization between the clocks 116 and 130. Accordingly, at step 174, the first and second offsets may used to adjust the timing reference of the A/V decoder 124 (e.g., clock signal 144) so as to synchronize it with the clock 114 of the MPEG server 102, as described in greater detail with reference to FIGS. 5-8. Moreover, as noted below, the fullness of the input buffer 122 may be monitored and used to detect an error which may be used to further adjust the clock signal 144. In this instance, a trend toward a potential buffer underflow or overflow may be used to detect whether or not the clock synchronizations is operating properly and the client clock can be artificially slowed down or sped up to compensate for the error and thus avoid the underflow and overflow. Moreover, the MPEG client 104 may implement a crash lock mechanism whereby the MPEG client, after first connecting to the MPEG server 102, may utilize the absolute server time and the $\Delta ppm_1$ value in the first received heartbeat message 900 (FIG. 11) to set it's local absolute time equal to the absolute time of the MPEG server 102 plus some additional predetermined time (e.g., 0.5 seconds) corresponding to the network's buffer size. The MPEG client further may use this crash lock technique after a channel change or if it is determined that the absolute time of the MPEG client 104 is too far out of synch with the absolute time of the MPEG server 102.

Figure 4:
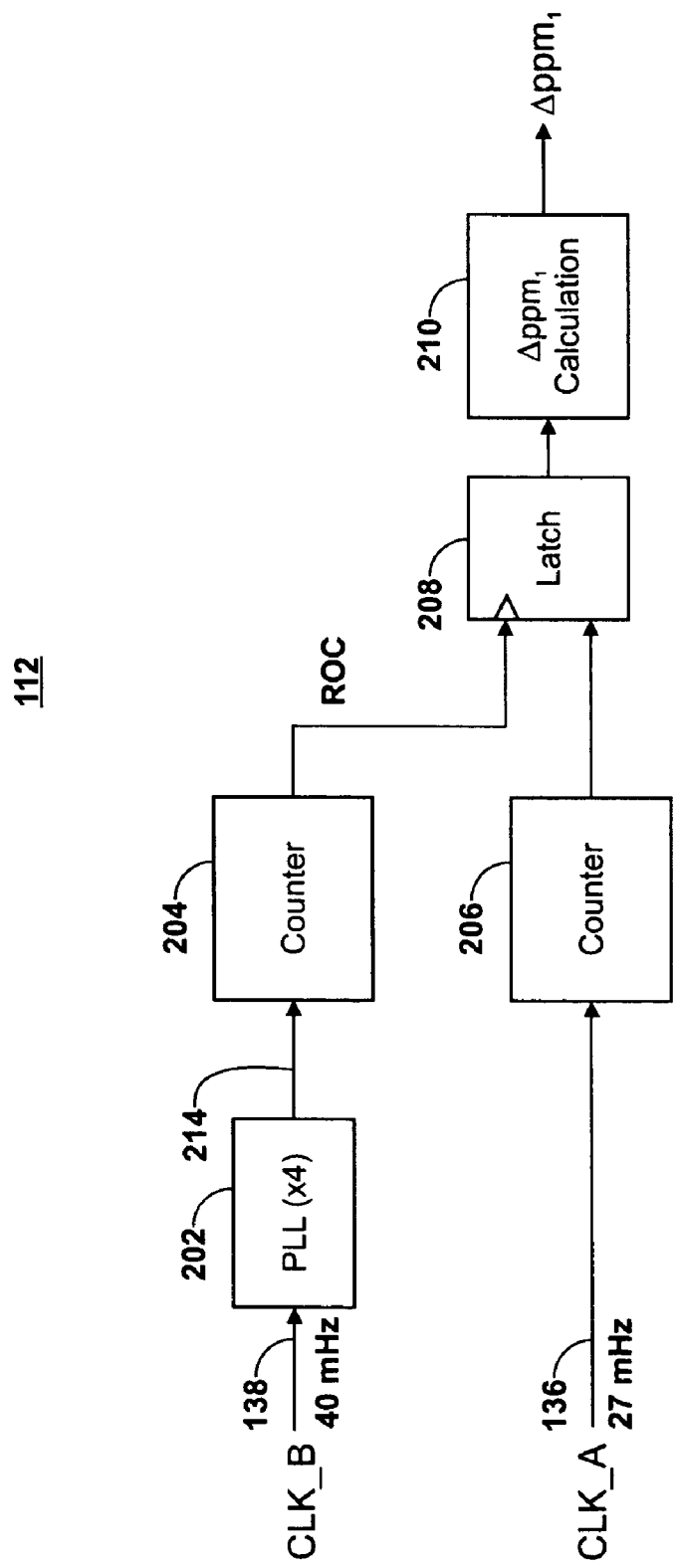
FIG. 4 is a block diagram illustrating an exemplary transmitter synchronization module in accordance with at least one embodiment of the present disclosure.

Referring now to FIG. 4, an exemplary implementation of the transmitter synchronization module 112 is illustrated in accordance with at least one embodiment of the present disclosure. In the illustrated example, the synchronization module 112 comprises a scaling PLL 202, counters 204, 206, a latch 208, and a clock offset calculation module 210. The scaling PLL 202 receives as an input the clock signal 138 and outputs a clock signal 214 scaled by a predetermined scaling factor. In the illustrated example, the frequency $f_B$ of the clock signal 138 is approximately 40 MHz and the scaling factor of the scaling PLL 202 is four, resulting in the scaled clock signal 214 having a frequency of approximately 160 MHz. The clock signal 214 is used to increment the counter 204 and the clock signal 136 (having a frequency $f_A$ of approximately 27 MHz) is used to increment the counter 206. The counter 204 has a programmable maximum count register and when the counter 204 reaches this maximum count, a ripple carry output (RCO) is provided at the output of the counter 204. The RCO is input to the latch 208, causing the latch 208 to latch to the current count of the counter 206 and further causing the counters 204 and 206 to reset to zero. The current count of the counter 206 is provided to the clock offset calculation module 210 whereupon the clock offset value $\Delta ppm_1$ is calculated.

It will be appreciated that the current count of the counter 206 is representative of the number of clock cycles of the clock signal 136 during a predetermined number of clock cycles of the clock signal 214 (which was scaled to improve its resolution). From the current count of the counter 206, the clock offset calculation 210 may determine the clock offset value $\Delta ppm_1$ in accordance with the following equations:

$$C1 = \text{Bit\_Count}/\text{Freq}_E * (\text{Freq}_A + \text{Freq}_A * \text{ppm}_{max\_offset}/1e6) \quad \{\text{EQ. 1}\}$$

$$C2 = \text{Bit\_Count}/\text{Freq}_E * (\text{Freq}_A - \text{Freq}_A * \text{ppm}_{min\_offset}/1e6) \quad \{\text{EQ. 2}\}$$

$$\text{Gain} = \text{ppm}_{spread}/(C1-C2) \quad \{\text{EQ. 3}\}$$

$$\Delta ppm_1 = (\text{Freq}_A - C2) * \text{Gain} - \text{ppm}_{spread}/2 \quad \{\text{EQ. 4}\}$$

where Bit_Count represents the maximum unsigned number that may be represented by the number of bits in registers 204, 206 and 208 (e.g., Bit_Count=$2^{30}$ for a 30-bit register), $\text{Freq}_A$ represents the frequency of clock signal 136 (e.g., 27 MHz), $\text{Freq}_E$ represents the frequency of the scaled clock signal 214 (e.g., 160 MHz), $\text{ppm}_{max\_offset}$ represents the maximum ppm offset of the clocks 114, 116, 128 and 130 and $\text{ppm}_{min\_offset}$ represents the minimum ppm offset of the clocks 114, 116, 128 and 130, and $\text{ppm}_{spread}$ represents the spread between $\text{ppm}_{max\_offset}$ and $\text{ppm}_{min\_offset}$. As an example, $\text{ppm}_{max\_offset}$ typically would be approximately 40 ppm, $\text{ppm}_{min\_offset}$ might be approximately −40 ppm, for a total $\text{ppm}_{spread}$ of approximately 80 ppm.

Figure 5:
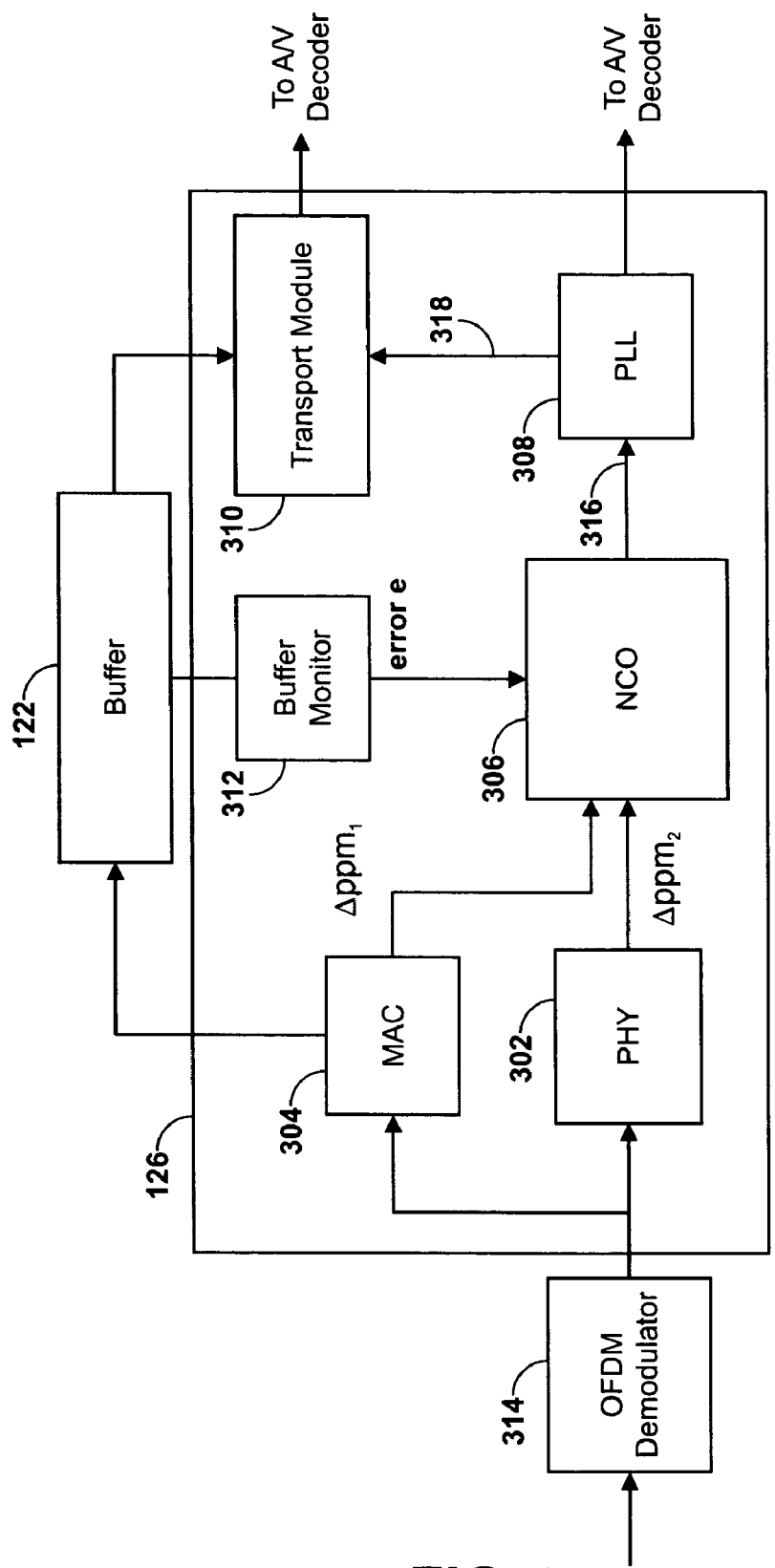
FIG. 5 is a block diagram illustrating an exemplary receiver synchronization module in accordance with at least one embodiment of the present disclosure.

Referring now to FIG. 5, an exemplary implementation of the receiver synchronization module 126 is illustrated in accordance with at least one embodiment of the present disclosure. In the illustrated example, the synchronization module 126 comprises a PHY processor 302, a MAC processor 304, a numerically controlled oscillator (NCO) 306, a PLL 308 a transport module 310 and buffer monitor 312.

Upon reception of a wireless signal, an orthogonal frequency division multiplexing (OFDM) demodulator 314 of the RF transceiver 120 demodulates the wireless signal and provides the resulting A/V data to the MAC processor 304, which in turn buffers the A/V data in the input buffer 122. As discussed in detail below, the MAC processor 304 (or, alternatively, the PHY processor 302) may convert the timing reference values (e.g., PCRs or SCRs) embedded in the A/V data from relative values back to absolute values. As noted above, the data also may include a representation of the clock offset value $\Delta ppm_1$, which the MAC processor 304 uses to control the NCO 306. The OFDM demodulator 314 further provides a phase offset or frequency offset to the PHY processor 302, where the phase/frequency offset is determined from timing circuits of the OFDM demodulator 314 (such as detectors, synchronizers and PLLs) that continuously run to correctly recover the data. Typically, this phase/frequency offset is averaged over a number of packets to obtain a frequency or phase offset accurate within fractions of a ppm. The PHY processor 302 determines the clock offset value $\Delta ppm_2$ from this phase/frequency offset and provides the clock offset value $\Delta ppm_2$ to control the NCO 306. The buffer monitor 312, in one embodiment, monitors the fullness of the buffer 122 to determine whether the fullness of the buffer has fallen below a lower threshold or has risen above a higher threshold. Based on this comparison, the buffer monitor 312 provides an error e to the NCO 312.

The NCO 312 output frequency is adjusted based on the clock offset values $\Delta ppm_1$ and $\Delta ppm_2$ and the error e. It will be appreciated that the resulting signal 316 output by the NCO 312 will be "dirty" (i.e., having a periodic clock cycles) and therefore is smoothed by the PLL 308. The resulting clock signal 318 then may be provided to the transport module 310, which uses the clock signal 318 for timing the removal of A/V data from the buffer 122. The clock signal 318 is also provided to the A/V decoder 124 for use in timing the decoding and display of the A/V data provided by the transport module 310.

Figure 6:
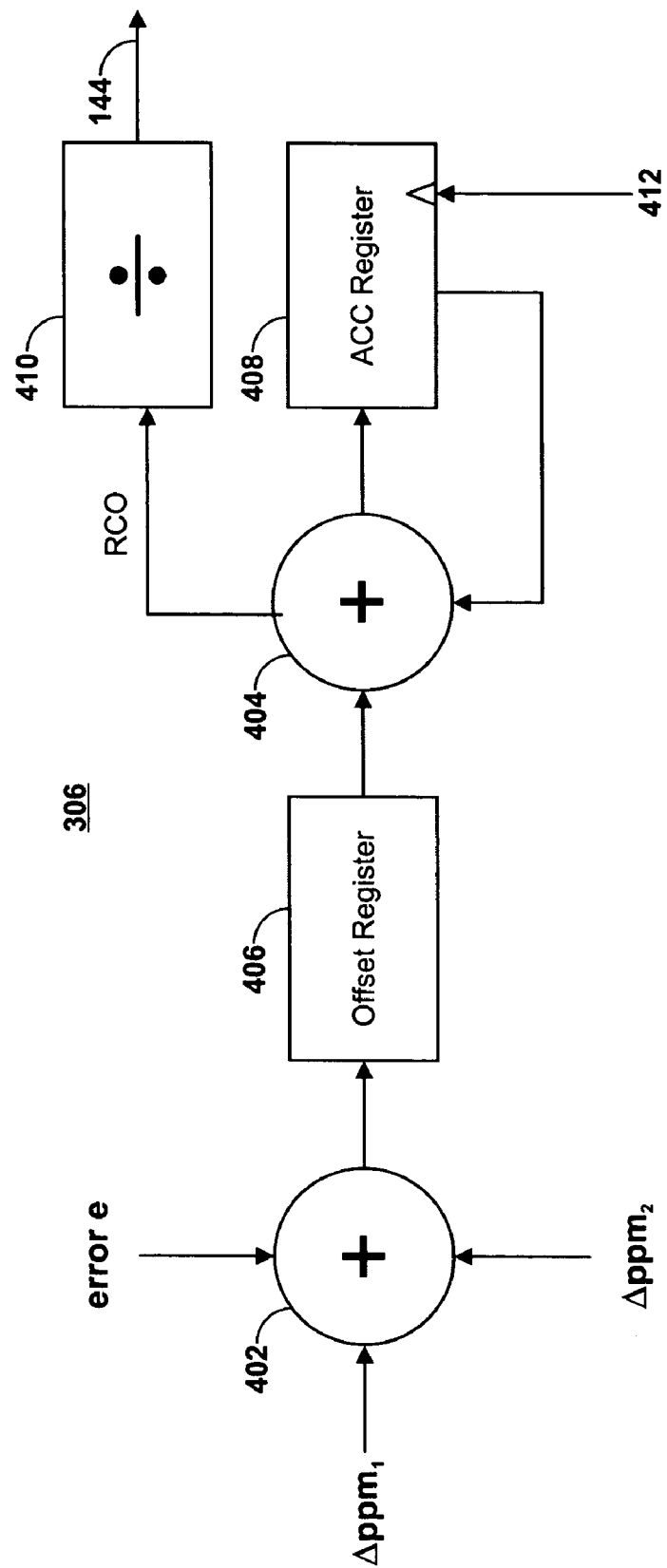
FIG. 6 is a block diagram illustrating an exemplary numerically controlled oscillator in accordance with at least one embodiment of the present disclosure.

Referring now to FIG. 6, an exemplary implementation of the NCO 306 is illustrated in accordance with at least one embodiment of the present disclosure. The NCO 306 comprises two summation modules 402, 404, an offset register 406, an ACC register 408 and a divider 410. In operation, the clock offset values $\Delta ppm_1$ and $\Delta ppm_2$ and the error e are summed by the summation module 402 and loaded into the offset register 406. Although not illustrated, the summation module 402 may comprise an additional input, e.g., a nominal ppm input, such that the summation module 402 outputs a nominal ppm value when the inputs for error e, $\Delta ppm_1$ and $\Delta ppm_2$ are zero so that the nominal frequency will be output. The contents of the offset register 406 are continually added to the ACC register 408 by the summation module 404, which in turn updates at a rate determined by a clock signal 412, which represents a scaled representation of the clock signal 144. At each occurrence of a RCO, the state of the divider 410 changes, thereby creating the clock signal 144, which has the desired ppm offset from the clock signal 412. The clock signal 144, being substantially synchronized to the clock signal 136 using the techniques described above, then may be provided to the A/V decoder 124 for accurate timing of its decoding operations.

Figure 7:
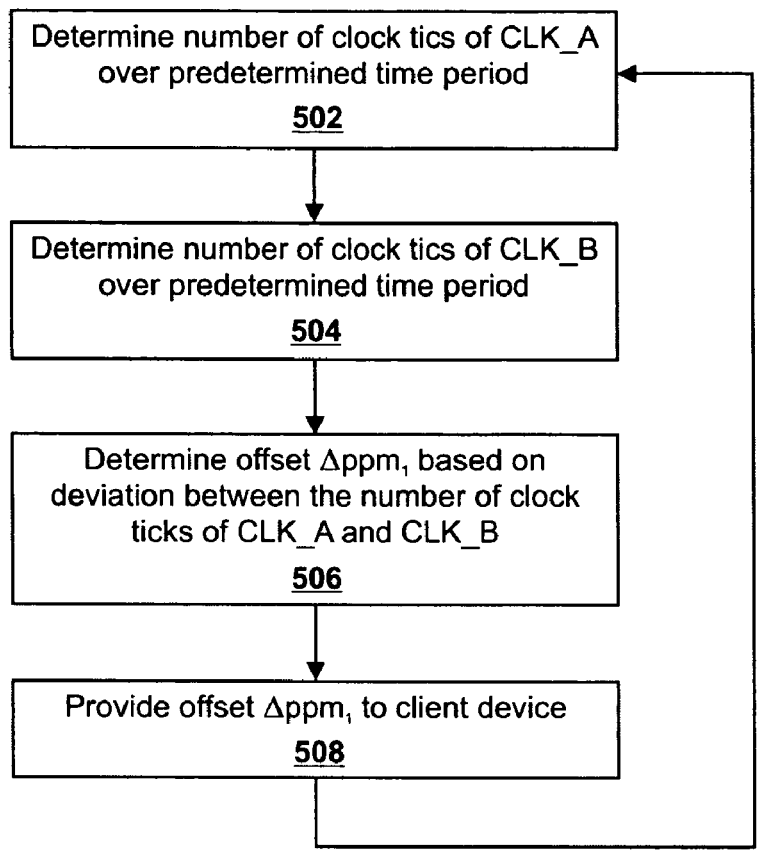
FIG. 7 is a flow diagram illustrating an exemplary operation of a transmission synchronization module in accordance with at least one embodiment of the present disclosure.
Figure 8:
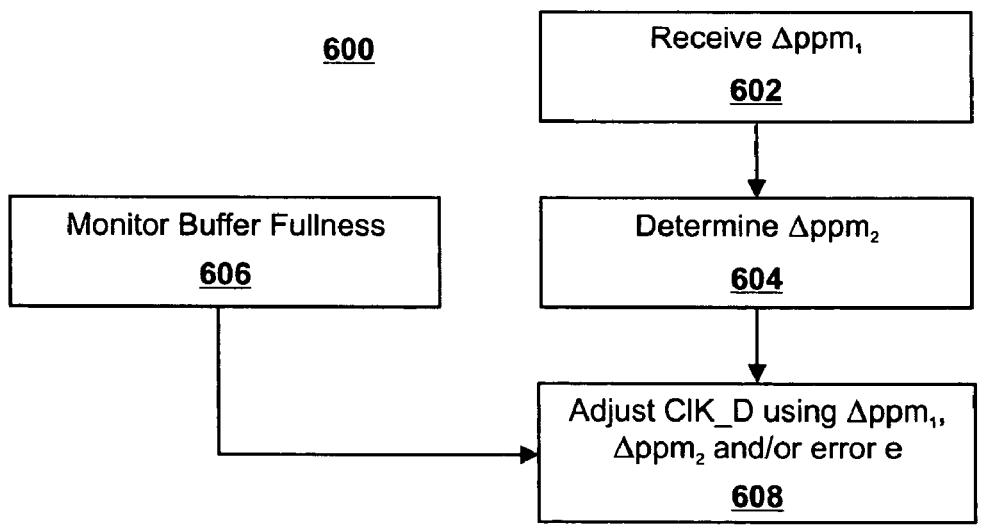
FIG. 8 is a flow diagram illustrating an exemplary method for clock synchronization in accordance with at least one embodiment of the present disclosure.

Referring now to FIGS. 7 and 8, exemplary general methods 500 and 600 summarizing the above-described techniques are illustrated. Method 500 initiates at step 502 wherein the number of clock cycles of the clock signal 136 over a predetermined time period are measured. At step 504, the number of clock cycles of the clock signal 138 are measured over the same time period. At step 506, the clock offset value $\Delta ppm_1$ is determined from a comparison of the clock cycles measured in steps 502 and 504, as discussed above with respect to FIG. 2. At step 508, the clock offset value $\Delta ppm_1$ is provided from the MPEG server 102 to the MPEG client 102 via the wireless link 106 for use in adjusting one or more of the clock sources of the MPEG client 104.

Method 600 initiates at step 602 whereupon the MPEG client 104 receives the clock offset value $\Delta ppm_1$. At step 604, the clock offset value $\Delta ppm_2$ is determined. Meanwhile, at step 606, the fullness of the buffer 122 is monitored by comparing the fullness with one or more low and high thresholds to detect a potential buffer underflow or overflow. Based on this comparison, an error value e is generated. At step 608, the clock signal 144 provided to the A/V decoder 124 is adjusted based on the clock offset values $\Delta ppm_1$, $\Delta ppm_2$ and the error value e so as to more closely synchronize the clock signal 144 to the clock signal 136.

Figure 9:
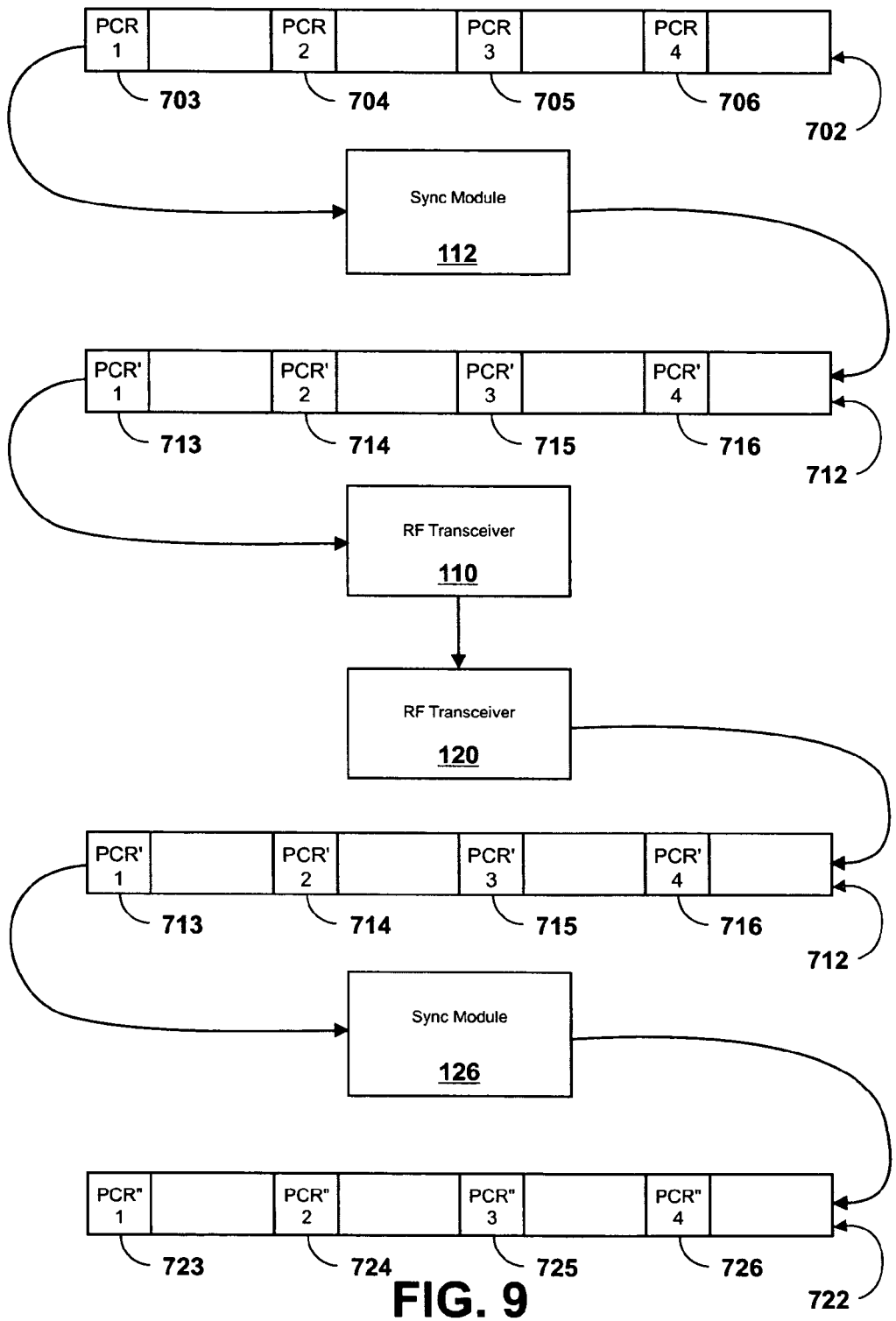
FIG. 9 is a flow diagram illustrating an exemplary method for synchronizing a playback and adjusting time stamps of a multimedia data stream in accordance with at least one embodiment of the present disclosure.

Referring now to FIG. 9, an exemplary technique for converting the timing reference values (e.g., PCRs or SCRs) of an MPEG data stream from absolute values to relative values, and vice versa, is illustrated in accordance with at least one embodiment of the present disclosure. For ease of illustration, the technique is described in the context of PCRs in an MPEG transport stream (TS). However, using the guidelines provided herein, this technique may be utilized to convert SCRs in MPEG program streams (PS) without departing from the spirit or the scope of the present disclosure.

As illustrated, an MPEG transport stream 702 comprising a plurality of PCR values 703-706 (also referred to herein as $PCR_1$-$PCR_4$, respectively) is provided from the A/V encoder 108 (FIG. 1) to the transmitter synchronization module 112. A component of the synchronization module 112, converts the PCR values 703-706 from absolute timing reference values to relative PCR values 713-716, respectively (also referred to herein as $PCR'_1$-$PCR'_4$). In at least one embodiment, the PCR values 703-706 are converted to relative PCR values 713-716 by subtracting the local timing reference, herein referred to as the real time protocol (RTP) clock of the MPEG server 102, which, in one embodiment comprises the counter incremented by the local clock 114. To illustrate, each PCR value 703-706 may be converted in accordance with the following equation:

$$PCR'_x = PCR_x - RTP_{Server} \qquad \{EQ.\,5\}$$

where $RTP_{Server}$ represents the value of the RTP counter incremented by local clock 114.

The resulting MPEG TS stream 712 then is packetized and transmitted between the RF transceiver 110 of the MPEG server 102 and the RF transceiver 120 of the MPEG client 104. At the MPEG client 104, the MPEG stream 712 is depacketized and a component of the receiver synchronization module 126 converts the relative PCR values 713-716 back to absolute PCR values 723-726 (also referred to herein as $PCR''_1$-$PCR''_4$). In one embodiment, the synchronization module 126 converts the PCR values back to absolute values by adding the client RTP counter value (incremented by the clock 128) of the MPEG client 104 to generate the PCR values in accordance with the following equation:

$$PCR''_x = PCR'_x + RTP_{Client} \qquad \{EQ.\,6\}$$

where $RTP_{Client}$ represents the value of the RTP by the local clock 128.

Note that when EQ. 6 is substituted into EQ. 7, the following equation results:

$$PCR''_x = PCR_x - RTP_{Server} + RTP_{Client} \qquad \{EQ.\,7\}$$

Thus, presuming that $RTP_{Server}$ and $RTP_{Client}$ are synchronized (i.e., $RTP_{Server} \sim = RTP_{Client}$), EQ. 8 simplifies to:

$$PCR''_x \sim = PCR_x \qquad \{EQ.\,8\}$$

Thus, as EQ. 9 demonstrates, the conversion from absolute PCR values to relative PCR values at the MPEG server 102 and the subsequent conversion of the relative PCR values back to absolute PCR values recovers the original PCR values (assuming the server and client RTP counters are synchronization) while reducing or eliminating the effects of jitter and propagation delay between the MPEG server 102 and the MPEG client 104 on the PCR values in the resulting MPEG transport stream 722.

Figure 10:
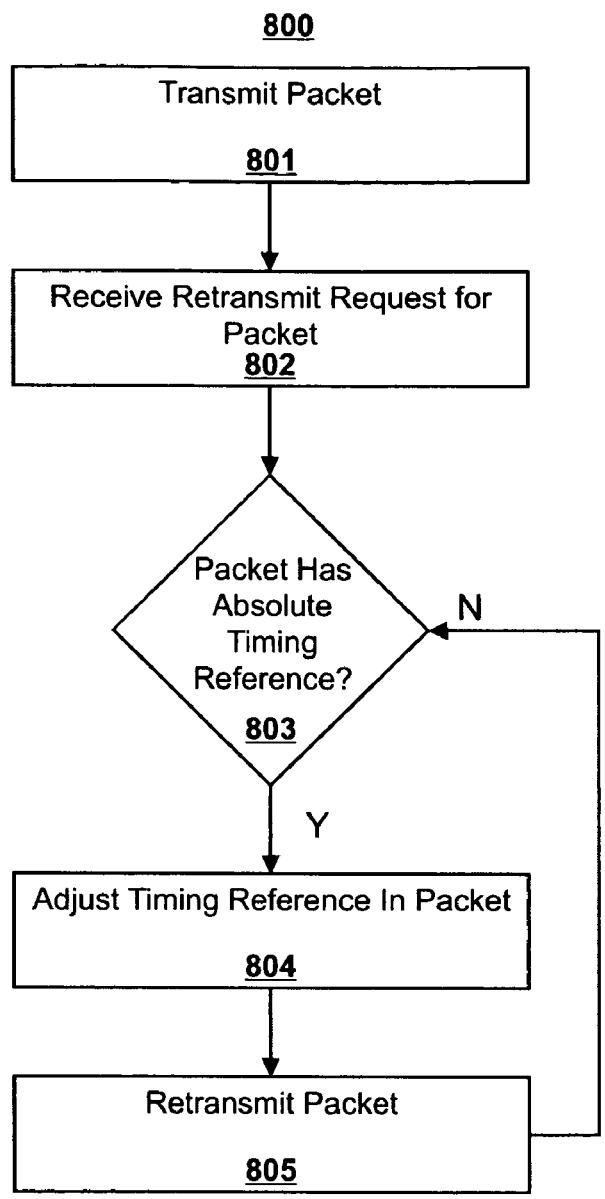
FIG. 10 is a flow diagram illustrating an exemplary method for the retransmission of packets in accordance with at least one embodiment of the present disclosure.

Referring now to FIG. 10, an exemplary packet retransmission method 800 is illustrated in accordance with at least one embodiment of the present disclosure. Many packet-switched network protocols provide for a packet retransmission technique wherein a receiving device may request the retransmission of a packet upon the determination that the packet was not received or was received in a corrupted form. However, these conventional retransmission techniques simply provide that the same exact packet be retransmitted. However, this may result in timing issues at the receive if the packet contains absolute timing reference values, such as the network heartbeat message 900 (FIG. 11) as the subsequent retransmission of packets having the same absolute timing reference value may cause undesirable time shifts at the receiving device.

Accordingly, in one embodiment, the MPEG server 102 implements method 800 in order to adjust the value of absolute timing references in retransmitted packets so as to reduce the occurrence and magnitude of such timing issues. At step 801, a packet is transmitted from the MPEG server 102 to the MPEG client 104. At step 802, the MAC processor 304 (FIG. 5) determines that the packet was not received or was corrupted. Accordingly, the MAC processor 304 provides a retransmit packet request to the MPEG server 102. A MAP processor at the MPEG server 102 determines whether the packet contains an absolute timing reference value. If so, the absolute timing reference value is adjusted based on the local clock at step 804 and the packet is retransmitted at step 805. If not, the packet is retransmitted without alteration at step 805.

Other embodiments, uses, and advantages of the present disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
   receiving, at a first multimedia processing device, a first offset value representative of a frequency offset between a first clock signal of a first clock source and a second clock signal of a second clock source of a second multimedia processing device, the first clock signal driving a multimedia encoder of the second multimedia processing device and the second clock signal driving a network interface of the second multimedia processing device;
   determining, at the first multimedia processing device, a second offset value representative of a frequency offset between the second clock signal and a third clock signal of a third clock source, the third clock signal driving a network interface of the first multimedia processing device;
   adjusting a fourth clock signal of a fourth clock source of the first multimedia processing device based on the first offset value and the second offset value to generate an adjusted fourth clock signal, the adjusted fourth clock signal driving a multimedia decoder of the first multimedia processing device;
   receiving, at the network interface of the first multimedia processing device, an encoded multimedia data stream from the network interface of the second multimedia processing device, wherein the encoded multimedia data stream is encoded based on the first clock signal; and
   decoding the encoded multimedia data stream at the multimedia decoder based on the adjusted fourth clock signal.

2. The method of claim 1, wherein adjusting the fourth clock signal further comprises adjusting the fourth clock signal based on an error value determined from a fullness of an input buffer to store the encoded multimedia data stream at the first multimedia processing device.

3. The method of claim 1, wherein the network interfaces comprise wireless transceivers.

4. The method of claim 3, wherein the wireless transceivers are compatible with IEEE 802.11.

5. The method of claim 1, wherein the network interfaces include PHY-based interfaces.

6. The method of claim 1, wherein the first offset value represents a difference between clock ticks of the first clock signal and clock ticks of the second clock signal over a predetermined time period.

7. The method of claim 1, further comprising:
   receiving, at the first multimedia processing device, a multimedia stream having a first plurality of timing references, the first plurality of timing references representing absolute timing references converted to relative timing references based on the first clock signal;
   converting, at the first multimedia device, the first plurality of timing references from the relative timing references to absolute timing references based on the adjusted fourth clock signal to generate a second plurality of timing references; and
   synchronizing a numerically controlled oscillator (NCO) of the multimedia decoder based on at least a subset of the second plurality of timing references.

8. The method of claim 7, further comprising filtering an output of the NCO using a phase-locked loop (PLL).

9. The method of claim 7, wherein the multimedia stream includes an MPEG stream.

10. The method of claim 9, wherein the first plurality of timing references include primary reference clock (PRC) values or system reference clock (SRC) clock values.

11. The method of claim 1, wherein the encoded multimedia data stream comprises an MPEG stream.

12. The method of claim 1, wherein the multimedia encoder is an MPEG encoder and the multimedia decoder is an MPEG decoder.

13. A method comprising:
   determining, at a first multimedia processing device, a first frequency offset between a first clock source used to drive a multimedia encoder of the first multimedia processing device and a second clock source used to drive a network interface of the first multimedia processing device;
   encapsulating a value representative of the first frequency offset in at least one packet; providing the at least one packet to a second multimedia processing device via the network interface of the first multimedia processing device;
   determining a second frequency offset between the second clock source and a third clock source used to drive a network interface of the second multimedia processing device; and
   adjusting a fourth clock source used to drive a multimedia decoder of the second multimedia processing device based on the first frequency offset and the second frequency offset.

14. The method of claim 13, wherein determining the first frequency offset includes comparing a number of clock cycles of the first clock source over a predetermined period with a number of clock cycles of the second clock source over the predetermined period.

15. The method of claim 13, wherein the network interface comprises a wireless interface.

16. The method of claim 13, wherein the wireless interface is compatible with IEEE 802.11.

17. The method of claim 13, wherein the first frequency offset represents a difference between clock ticks of the first clock source and clock ticks of the second clock source over a predetermined time period.

18. The method of claim 13, wherein the multimedia encoder comprises an MPEG encoder. pg,6

19. A system comprising:
a first multimedia processing device including:
   a first clock source having an output to provide a first clock signal;
   a second clock source having an output to provide a second clock signal;
   a multimedia encoder having a first input operable coupled to the output of the first clock source, a second input to receive multimedia data, and an output to provide the encoded multimedia stream based on the first clock signal;
   a first network interface having a first input operable coupled to the output of the multimedia encoder, a second input operable coupled to the second clock source, and an output to provide the encoded multimedia stream; and
a second multimedia processing device including:
   a third clock source having an output to provide a third clock signal;
   a fourth clock source having an output to provide a fourth clock signal;
   a second network interface having a first input operably coupled to the output of the first network interface, a second input operably coupled to the output of the third clock source, and an output to provide the encoded multimedia stream;
   a multimedia decoder having a first input operably coupled to the output of the fourth clock source, a second input operably coupled to the output of the second network interface and an output to provide a decoded multimedia stream, and
   a first synchronization module having a input operably coupled to the output of the fourth clock source and an output operably coupled to the multimedia decoder, the first synchronization module operable to adjust the fourth clock signal based on a first offset value and a second offset value, the first offset value representative of a frequency offset between the first clock signal and the second clock signal and the second offset value representative of a frequency offset between the second clock signal and the third clock signal.

20. The system of claim 19, wherein the first multimedia processing device further comprises:
   a second synchronization module having a first input to receive the first clock signal and a second input to receive the second clock signal and an output to provide the first offset value based on the first clock signal and the second clock signal; and
   wherein the network interface is operable to provide a packetized representation of the first offset value for transmission.

21. The system of claim 20, wherein the first synchronization module is further operable to determine the second offset value.

22. The system of claim 19, wherein the second multimedia processing device further comprises an input buffer having an input operably coupled to the output of the second network interface, and wherein the first synchronization module further is operably to adjust the fourth clock signal based on an error value determined from a fullness of the input buffer.

23. The system of claim 19, wherein the first and the second network interfaces comprise wireless interfaces.

24. The system of claim 23, wherein the wireless interfaces are compatible with IEEE 802.11.

25. A multimedia processing device comprising:
   a first clock source having an output to provide a first clock signal;
   a second clock source having an output to provide a second clock signal;
   a network interface having a first input to receive a signal representative of an encoded multimedia data stream from a network and a second input operable coupled to the output of the first clock source, the encoded multimedia data stream having a plurality of relative timing reference values;
   a multimedia decoder having a first input operable coupled to the output of the second clock source and a second input operable coupled to the network interface, the multimedia decoder to decode at least a portion of the encoded multimedia data stream; and
   a synchronization module having a first input operably coupled the output of the first clock source, a second input operable coupled to the output of the second clock source and a third input operably coupled to the network interface, the synchronization module operable to:
      receive, from a second multimedia processing device, a first offset value representative of a frequency offset between a third clock source and fourth clock source of the second multimedia processing device the third clock source driving a multimedia encoder of the second multimedia processing device and the fourth clock source driving a network interface of the second multimedia processing device;
      determine a second offset value representative of a frequency offset between
      the first clock source and the fourth clock source;
      adjust the second clock source based on the first offset value and the second offset value; and
      convert the relative timing reference values to absolute timing reference values based on the second clock source.

26. The device of claim 25, further comprising an input buffer having an input operably coupled to the network interface and an output operably coupled to the second input of the multimedia decoder, and wherein the synchronization module is further adapted to adjust the second clock source based on an error value determined from a fullness of the input buffer.

27. The device of claim 25, wherein the first offset value represents a difference between clock ticks of the third clock source and clock ticks of the fourth clock source over a predetermined time period and the second offset value represents a difference between clock ticks of the first clock source and clock ticks of the second clock source over a predetermined time period.

28. The device of claim 25, wherein the multimedia data stream includes an MPEG stream.

29. The device of claim 25, wherein the network interface includes a wireless interface.

30. The device of claim 29, wherein the wireless interface is compliant with IEEE 802.11.

* * * * *